(12) United States Patent
Oikawa

(10) Patent No.: US 9,133,774 B2
(45) Date of Patent: Sep. 15, 2015

(54) VEHICULAR VIBRATION DAMPING CONTROL DEVICE AND VEHICLE MOUNTED WITH VIBRATION DAMPING CONTROL DEVICE

(75) Inventor: Yoshitaka Oikawa, Toyota (JP)

(73) Assignee: TOYOTA JIDOSHA KABUSHIKI KAISHA, Toyota-shi (JP)

(*) Notice: Subject to any disclaimer, the term of this patent is extended or adjusted under 35 U.S.C. 154(b) by 94 days.

(21) Appl. No.: 13/124,285

(22) PCT Filed: Sep. 10, 2009

(86) PCT No.: PCT/IB2009/006796
§ 371 (c)(1),
(2), (4) Date: Apr. 14, 2011

(87) PCT Pub. No.: WO2010/049766
PCT Pub. Date: May 6, 2010

(65) Prior Publication Data
US 2011/0202235 A1    Aug. 18, 2011

(30) Foreign Application Priority Data

Oct. 31, 2008  (JP) .................................. 2008-281197

(51) Int. Cl.
*G06F 7/00* (2006.01)
*F02D 11/10* (2006.01)
(Continued)

(52) U.S. Cl.
CPC ............. *F02D 11/107* (2013.01); *B60W 30/20* (2013.01); *B60W 10/06* (2013.01);
(Continued)

(58) Field of Classification Search
CPC ..... G06F 17/00; B60K 35/00; B60H 1/00642

USPC ......................................................... 701/36
See application file for complete search history.

(56) References Cited

U.S. PATENT DOCUMENTS 5,333,584 A     8/1994 Kamio et al.
5,852,996 A  *  12/1998 Nakamura et al. ............ 123/399
(Continued)

FOREIGN PATENT DOCUMENTS

DE     198 60 762        7/2000
DE     100 01 396 A1     7/2001
(Continued)

OTHER PUBLICATIONS

Japanese Office Action issued Mar. 21, 2012 in Patent Application No. 2008-281197 with English Translation.
(Continued)

*Primary Examiner* — Behrang Badii
*Assistant Examiner* — Daniel L Greene
(74) *Attorney, Agent, or Firm* — Oblon, McClelland, Maier & Neustadt, L.L.P.

(57) ABSTRACT

A vehicular vibration damping control device that performs vibration damping of pitch/bounce vibrations of a vehicle through drive output control includes a vibration damping control portion that controls a driving torque of an engine to perform pitch/bounce vibration damping, and a compensation component adjustment portion that reduces the magnitude of a compensation component for compensating for a wheel torque calculated by the vibration damping control portion on the basis of an amount of change in the throttle opening degree of the engine. The compensation component is reduced when the temperature of a conductor for supplying a current to a throttle motor for adjusting a throttle opening degree estimated on the basis of the amount of change in throttle opening degree becomes higher than a predetermined value.

15 Claims, 7 Drawing Sheets

(51) Int. Cl.
   *B60W 30/20* (2006.01)
   *B60W 10/06* (2006.01)
   *F02D 41/14* (2006.01)
   *F02D 41/20* (2006.01)

(52) U.S. Cl.
   CPC ..... *B60W 2510/0609* (2013.01); *F02D 11/105* (2013.01); *F02D 2041/1422* (2013.01); *F02D 2041/2065* (2013.01); *F02D 2250/28* (2013.01)

(56) References Cited

U.S. PATENT DOCUMENTS

| | | | | |
|---|---|---|---|---|
| 6,102,144 | A | * | 8/2000 | Lutz ............................ 180/65.25 |
| 2005/0049761 | A1 | | 3/2005 | Kataoka et al. |
| 2005/0252485 | A1 | * | 11/2005 | Miyazaki ...................... 123/396 |
| 2006/0052908 | A1 | | 3/2006 | Matsumoto et al. |

FOREIGN PATENT DOCUMENTS

| | | |
|---|---|---|
| DE | 10 2004 036 134 | 3/2006 |
| FR | 2 804 219 | 7/2001 |
| JP | 09-158764 A | 6/1997 |
| JP | 2004 168148 | 6/2004 |
| JP | 2005-155351 A | 6/2005 |
| JP | 2006 69472 | 3/2006 |
| JP | 2008-231989 A | 10/2008 |

OTHER PUBLICATIONS

International Search Report issued Feb. 2, 2010 in PCT/IB09/06796 filed Sep. 10, 2009.

German Office Action issued Apr. 29, 2014 in Patent Application No. 11 2009 002 475.0 (Partial English Translation only).

* cited by examiner

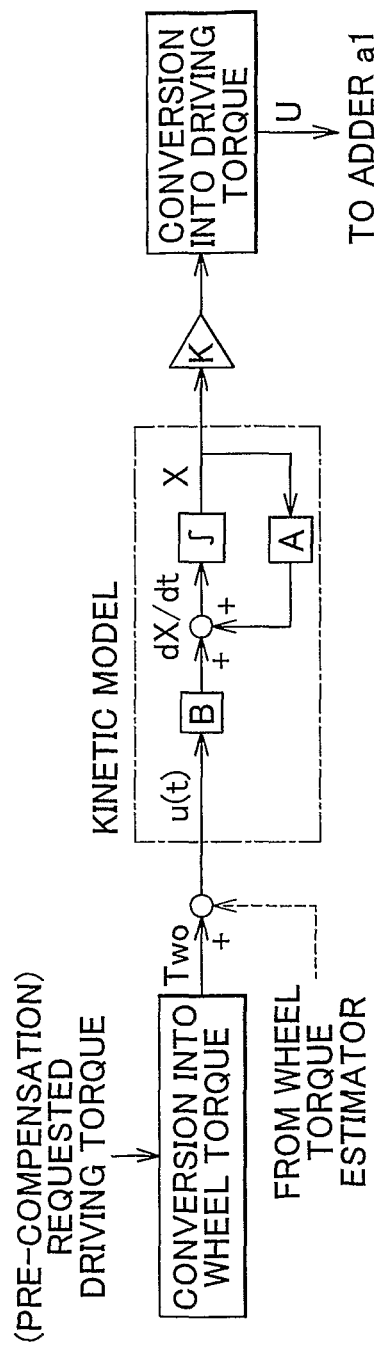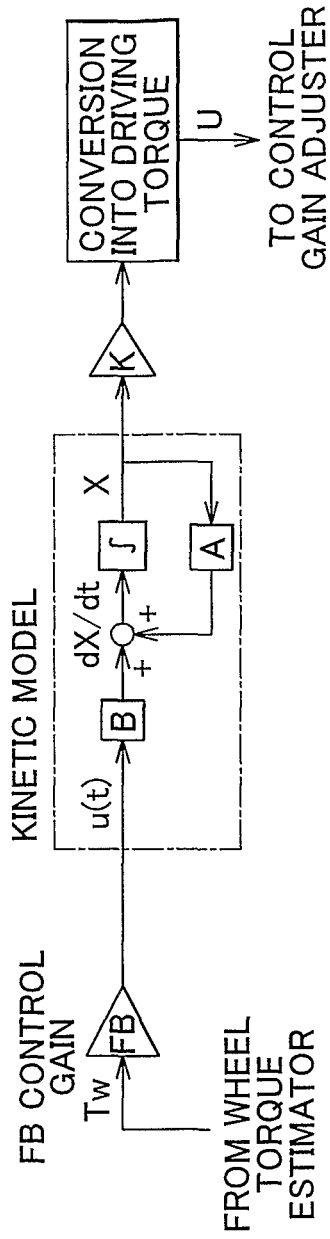

VEHICULAR VIBRATION DAMPING CONTROL DEVICE AND VEHICLE MOUNTED WITH VIBRATION DAMPING CONTROL DEVICE

BACKGROUND OF THE INVENTION

1. Field of the Invention

The invention relates to a vibration damping control device for a vehicle such as an automobile or the like, and more specifically, to a vibration damping control device that controls a drive output (a driving force or a driving torque) of a vehicle employing an engine as a drive unit to damp vibrations of a vehicle body, and to the vehicle mounted with the vibration damping control device.

2. Description of the Related Art

While vibrations such as pitch/bounce vibrations and the like during the running of a vehicle are caused by a braking/driving force (or an inertial force) acting on a vehicle body during acceleration/deceleration of the vehicle or other external forces acting on the vehicle body, these forces are reflected by "wheel torques" applied to a road surface by wheels (driving wheels when the vehicle is driven) (torques acting between the wheels and the road surface on which the wheels are grounded). Thus, in the field of vibration damping control for a vehicle, it is proposed to damp vibrations of a vehicle body during the running of the vehicle by adjusting wheel torques through drive output control of an engine of the vehicle or any other drive unit of the vehicle (e.g., see Japanese Patent Application Publication No. 2004-168148 (JP-A-2004-168148) and Japanese Patent Application Publication No. 2006-69472 (JP-A-2006-69472)). In this vibration damping control of damping vibrations through drive output control, pitch/bounce vibrations that are caused to the vehicle body when a request for acceleration/deceleration of the vehicle is made or when an external force (a disturbance) acts on the vehicle body to cause fluctuations in wheel torques are predicted using a kinetic model structured assuming a mechanical model of so-called sprung vibrations of the vehicle body or so-called sprung/unsprung vibrations of the vehicle body, and a drive output of a drive unit of the vehicle is so adjusted as to damp the predicted vibrations. In the case of vibration damping control thus designed, the generation of vibrational energy is suppressed more through the adjustment of the source of a force causing vibrations than through the absorption of generated vibrational energy as in the case of vibration damping control by a suspension. Therefore, advantages such as relative swiftness of the operation of vibration damping, high energy efficiency, and the like are obtained. Further, in vibration damping control as described above, the object to be controlled is confined to wheel torques or braking/driving forces applied to the wheels. Therefore, the adjustment of control is easy.

When vibration damping control is performed through the aforementioned drive output control, the output of the drive unit is vibrationally fluctuated more often than usual to control the wheel torques in such a manner as to damp pitch/bounce vibrations of the vehicle. In this respect, when the output is vibrationally fluctuated through vibration damping control as described above in the case where the drive unit of the vehicle is a gasoline engine, the temperature of a throttle motor for adjusting the opening degree of an electronically controlled throttle that controls an intake air amount of the engine, an actuator, or a conductor thereof rises. It has been found out that the operation responsiveness of the throttle motor or the actuator may thereby deteriorate.

In the case where the gasoline engine is employed as the drive unit, the control of the intake air amount for drive output control for performing vibration damping control as described above is performed through the control of adjusting the opening degree of the electronically controlled throttle. In this control of the electronically controlled throttle, "the throttle motor" or "the actuator" is operated to displace the position or angle of a valve body of a throttle valve such that the throttle opening degree becomes equal to an opening degree for achieving an intake air amount determined according to an arbitrary method by an electronic control unit. A DC motor, a stepping motor, or the like is typically adopted as the throttle motor or the actuator. This motor or this actuator is urged by being supplied with a current while being controlled by the electronic control unit, and drives the valve body such that an actual opening degree of the throttle valve coincides with a requested throttle opening degree (a target value of the throttle opening degree) corresponding to a requested value of the intake air amount, on the basis of a value of the position or angle of the valve body detected by a throttle position sensor or a throttle opening degree sensor or a value of the air amount detected by an intake air amount sensor. In this configuration, when vibration damping control requests a vibrational drive output as described above, the intake air amount and hence the requested throttle opening degree vibrationally change as well. Therefore, when the frequency with which the position or angle of the valve body is displaced increases and especially the frequency and/or amplitude of changes in the position or angle of the valve body increase, the amount of the current per unit time and the amount of heat generation resulting therefrom increase. In consequence, the temperature of the throttle motor, the actuator, or the conductor thereof may rise. (In the case where the valve body is driven by the aforementioned motor adopted in the electronically controlled typical throttle valve, the urging current of the motor in shifting the position or angle of the valve body more drastically increases than a holding current in the case where the valve body is held at a certain position or a certain angle.) When the temperature of the throttle motor, the actuator, or the conductor thereof then rises, the operation responsiveness of the throttle motor or the actuator slows down. A deterioration in the stability of vibration damping control and a delay or shift in the phase of the vibrational displacement of the throttle opening degree may thereby be caused. In some cases, therefore, the effect of vibration damping is not sufficiently obtained.

SUMMARY OF THE INVENTION

The invention proposes a configuration for avoiding a rise in temperature of a throttle motor, an actuator, or a conductor thereof that results from vibrational changes in opening degree of an electronically controlled throttle for an intake air amount in the case where drive output control by a gasoline engine is performed in pitch/bounce vibration damping control as described above.

Further, the invention provides a vibration damping control device so configured as to prevent the control operation of vibration damping control from being weakened while avoiding a rise in the temperature of the throttle motor, the actuator, or the conductor thereof as described above, and a vehicle mounted with the vibration damping control device.

A vehicular vibration damping control device according to a first aspect of the invention controls a throttle opening degree in such a manner as to damp at least one of a vibration component of a vehicle resulting from an input from a road surface and a vibration component of the vehicle resulting from an input to an operation element including an acceleration pedal and a brake. In the vibration damping control device, an amount of change in the throttle opening degree alters depending on a temperature of an actuator of a throttle valve of an engine being high or low. According to this configuration, a compensation component according to vibration damping control is not always directly given to a throttle motor or the actuator as a control command for drive output control, and at least part of the compensation component according to vibration damping control is altered in accordance with a temperature of the actuator of the throttle valve of the engine. Therefore, the frequency or magnitude of fluctuations in the throttle opening degree is reduced, and accordingly, the amount of current is reduced. Thus, a rise in the temperature of the throttle motor, the actuator, or a conductor thereof is likely to be avoided.

A vehicular vibration damping control device according to a second aspect of the invention, which performs vibration damping control for damping pitch vibrations of a vehicle or bounce vibrations of the vehicle through control of a drive output of the vehicle, includes a vibration damping control portion that controls a driving torque of an engine in such a manner as to restrain an amplitude of the pitch vibrations or the bounce vibrations on a basis of a wheel torque acting on each wheel of the vehicle, which is generated at a location of a road surface where the wheel is grounded, and also, a compensation component adjustment portion that alters a magnitude of at least part of a compensation component for compensating for the wheel torque for vibration damping control, which is calculated by the vibration damping control portion, on a basis of an amount of change in a throttle opening degree of the engine by referring to the amount of change in the throttle opening degree with a view to avoiding a rise in temperature of a throttle motor, an actuator, or a conductor thereof. According to this configuration, the compensation component according to vibration damping control is not always directly given to the throttle motor or the actuator as a control command for drive output control. Instead, at least part of the compensation component according to vibration damping control is altered in accordance with the amount of change in the throttle opening degree. Therefore, the frequency or magnitude of fluctuations in the throttle opening degree is reduced, and accordingly, the amount of current is reduced. Thus, a rise in the temperature of the throttle motor, the actuator, or the conductor thereof is likely to be avoided. In the aforementioned configuration, the amount of change in the throttle opening degree referred to may be either an amount of change in a requested throttle opening degree or an amount of change in an actual throttle opening degree.

In the configuration of the throttle valve of the engine applied to the second aspect of the invention, as described already, it has been found out that the current supplied to the throttle motor or the actuator increases when the throttle opening degree changes. Accordingly, as the frequency and amplitude of the amount of change in the throttle opening degree increases, the possibility of a rise in the temperature of the throttle motor, the actuator, or the conductor thereof increases. Thus, in the configuration of the device according to the second aspect of the invention, the compensation component adjustment portion may reduce the magnitude of at least part of the compensation component for compensating for the wheel torque when the frequency or amplitude of the amount of change in the throttle opening degree becomes equal to or larger than a predetermined value. It should be noted herein that, in determining that the frequency or amplitude of the amount of change in the throttle opening degree has become equal to or larger than the predetermined value, a condition that a phenomenon of the frequency or amplitude of the amount of change in the throttle opening degree becoming equal to or larger than the predetermined value be observed even once may be used as a condition for making the determination, or a condition that a phenomenon of the frequency or amplitude of the amount of change in the throttle opening degree becoming equal to or larger than the predetermined value be observed more than a predetermined number of times within a predetermined period or consecutively may be used as a condition for making the determination. Further, in the process of research and development by the inventor of the invention, it has been found out that the temperature of a conductor of the throttle motor can be estimated on the basis of the amount of change in the throttle opening degree. Thus, in the configuration of the device according to the second aspect of the invention, the compensation component adjustment portion may estimate a temperature of a conductor for supplying a current to the throttle motor for adjusting the throttle opening degree on the basis of the amount of change in the throttle opening degree, and reduce the magnitude of at least part of the compensation component when the temperature of the conductor becomes higher than a predetermined value.

Further, as regards one mode in which the magnitude of at least part of the compensation component is reduced in the invention, as is understood from the foregoing description, one of the features of the component as a cause for a rise in temperature of the conductor of the throttle motor is that the frequency is high. Therefore, the compensation component adjustment portion may reduce the magnitude of at least part of the compensation component by removing the part, which has a frequency higher than a predetermined frequency, from a wheel torque value input to the vibration damping control portion or the compensation component. In a situation in which the magnitude of at least part of the compensation component should be reduced, a further rise in temperature should be avoided. Therefore, the compensation component adjustment portion may reduce the magnitude of at least part of the compensation component by reducing a control gain for the compensation component.

Furthermore, it is known that that part of the compensation component given from the vibration damping control portion which can have an especially high frequency is a compensation component for controlling a driving torque of the engine in such a manner as to restrain the amplitude of pitch vibrations or bounce vibrations caused by a wheel torque actually applied to each wheel (i.e., "a disturbance of the wheel torque"). Thus, in the vibration damping control device according to the second aspect of the invention, the vibration damping control portion may have a feedforward vibration damping control portion that calculates a compensation component for controlling a driving torque of the engine in such a manner as to restrain an amplitude of pitch vibrations or bounce vibrations caused by a wheel torque generated through a request for acceleration/deceleration of the vehicle or a request for a turn of the vehicle, and a feedback vibration damping control portion that calculates a compensation component for controlling the driving torque of the engine in such a manner as to restrain the amplitude of pitch vibrations or bounce vibrations caused by a wheel torque actually applied to each wheel, and the compensation component adjustment portion may reduce the magnitude of at least part of the compensation component calculated by the feedback vibration damping control portion. In this case, the feedforward vibration damping control portion corrects (compensates for) a control command for the drive output (torque) of the engine in such a manner as to prevent the occurrence of pitch vibrations or bounce vibrations resulting from fluctuations in the wheel torque with a relatively low frequency, which corresponds to the request for acceleration/deceleration of the vehicle or the request for the turn of the vehicle. On the other hand, the compensation component calculated by the feedback vibration damping control portion mainly damps pitch vibrations or bounce vibrations resulting from a disturbance acting on the vehicle body. Therefore, according to this configuration, the compensation component for damping pitch/bounce vibrations can be removed or reduced in accordance with the characteristic of the compensation component. A rise in the temperature of the throttle motor, the actuator, or the conductor thereof is expected to be reduced or suppressed without reducing the effect of the compensation component, which has relatively low frequency, calculated by the feedforward vibration damping control portion. It should be understood that the magnitude of at least part of the compensation component may be reduced according to any one of the foregoing methods. The feedforward vibration damping control portion refers to the request for the turn of the vehicle in order to restrain a vibrational component corresponding to changes in the wheel torque caused through changes in a steering angle of each wheel of the vehicle.

As is understood from the aforementioned series of descriptions, the device targeted by the invention is designed to prevent or restrain, through drive output control, a vibration component input from a road surface through each wheel from being transmitted to a vehicle body in a vehicle such as an automobile or the like in which a drive output thereof is adjusted through the control of the opening degree of a throttle of a gasoline engine. In other words, the device targeted by the invention can also be said to be a drive control device configured such that a torque reverse in phase to vibrations (usually about 1 to 4 Hz) causing vibrations to a vehicle body is applied to each wheel when such vibrations are caused in a wheel speed or a wheel torque. Then, in particular, the task of the invention is to avoid a rise in temperature of a throttle motor or an actuator resulting from a state in which the throttle opening degree more often fluctuates when a vibration component is input to the vehicle from a road surface than when no such vibration component is input to the vehicle. Thus, according to a third aspect of the invention, there is provided a vehicle that controls a throttle opening degree in such a manner as to damp at least one of a vibration component of the vehicle resulting from an input from a road surface and a vibration component of the vehicle resulting from an input to an operation element including an accelerator pedal and a brake pedal. In this vehicle, the throttle opening degree changes by an amount that is altered in accordance with a temperature of an actuator of a throttle valve.

Further, in the third aspect of the invention, the amount of change in the throttle opening degree may be reduced as the temperature of the actuator of the throttle valve rises. In this configuration, any method may be adopted as long as the temperature of the actuator of the throttle valve can be detected or estimated. For example, the temperature may be directly detected by providing the actuator of the throttle valve or the conductor thereof with a temperature sensor (a thermocouple or the like). Further, in the third aspect of the invention, a value representing operation responsiveness of the actuator of the throttle valve, for example, a difference between a value of a requested throttle opening degree and a value of an actual throttle opening degree or the like may be detected, and a temperature of the actuator of the throttle valve may be estimated on a basis of the value representing operation responsiveness of the actuator of the throttle valve (the responsive speed decreases as the temperature rises).

Further, as described already, in the case where the temperature of the actuator of the throttle valve does not fall or rises after the temperature having once risen and the amount of change in the throttle opening degree being reduced, when the throttle opening degree is further changed, the responsiveness of the throttle valve may further deteriorate. Thus, in the third aspect of the invention, the amount of change in the throttle opening degree may be reduced when the temperature of the actuator of the throttle valve becomes equal to a first temperature, and the throttle valve may be stopped from operating when the temperature of the actuator of the throttle valve becomes equal to a second temperature higher than the first temperature. According to this configuration, a recovery of the responsiveness of the throttle valve is expected due to a fall in the temperature of the throttle valve resulting from the stoppage of the operation of the throttle valve.

Pitch/bounce vibration damping control targeted by the invention is unique control requiring fluctuations in output more often than conventional drive output control. Therefore, in actually applying this control to the vehicle, it is necessary to ensure that this control matches various existing mechanisms regarding drive output control. The invention can be said to correct the configuration of vibration damping control so as not to deteriorate the responsiveness of the throttle motor or the actuator by suppressing a rise in the temperature of the throttle motor, the actuator, or the conductor thereof, which is especially selected from those existing mechanisms for drive output control. According to this configuration of the invention, even in the case where vibration damping control is incorporated with part of drive output control, a rise in the temperature of the throttle motor or the actuator is avoided. As a result, a deterioration in the responsiveness of the throttle motor or the actuator and the weakening of the effect of vibration damping resulting therefrom can be avoided.

Other objects and advantages of the invention will become apparent from the following description of a preferred embodiment of the invention.

BRIEF DESCRIPTION OF THE DRAWINGS

The foregoing and further features and advantages of the invention will become apparent from the following description of an example embodiment with reference to the accompanying drawings. In these drawings, like numerals are used to represent like elements.

FIG. 1B is a front view of a valve body (as viewed in the same direction as the flow of air through an intake pipe). FIG. 1C is a lateral sectional view of FIG. 1B. A current controller 22e supplies a current from a battery to a motor 74 on the basis of a control command from an electronic control unit, and the motor 74 generates a rotational force against a restoring force of a return spring such that an opening degree $\theta$st of a valve body 70 or an angular position $\psi$ of the valve body 70 coincides with a requested opening degree or a target angle. The value of the current flowing to the motor more drastically increases when the position of the valve body is displaced than when the valve body is held in position.

FIGS. 4A and 4B are views each showing the configuration of the vibration damping control portion according to the embodiment of the invention in the form of a control block diagram. FIGS. 4A and 4B show the configuration of a feed-forward vibration damping control portion 52a of FIG. 2 and the configuration of a feedback vibration damping control portion 52b respectively.

DETAILED DESCRIPTION OF EMBODIMENT

Figure 1A:
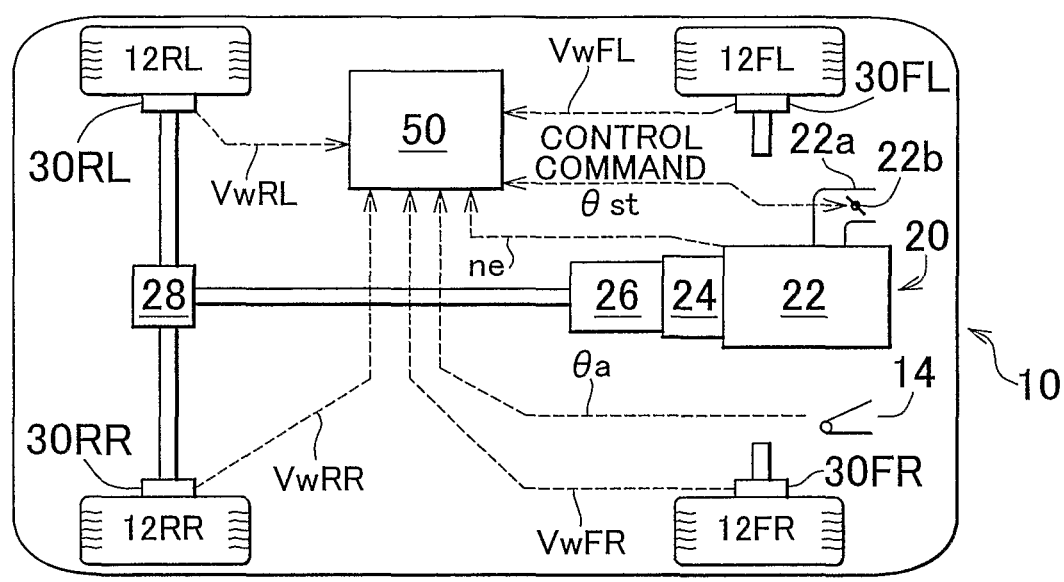
FIG. 1A is a schematic view of an automobile mounted with a vibration damping control device according to the embodiment of the invention.

A embodiment of the invention will be described hereinafter in detail with reference to the accompanying drawings. In the drawings, like reference symbols represent like components.

Configuration of Device

FIG. 1A schematically shows a vehicle such as an automobile or the like, which is mounted with a drive control device that performs vibration damping control according to the embodiment of the invention. In FIG. 1A, a vehicle 10 having a front-right wheel 12FR, a front-left wheel 12FL, a rear-right wheel 12RR, and a rear-left wheel 12RL is mounted with a drive unit 20 that applies a driving force or a driving torque to each of the rear wheels in accordance with depression of an accelerator pedal 14 by a driver in a normal mode. In an example shown in FIG. 1A, the drive unit 20 is configured to transmit a driving torque or a rotational driving force from an engine 22 to each of the rear wheels 12RR and 12RL via a torque converter 24, an automatic transmission 26, a differential gear mechanism 28, and the like. Although not shown in FIG. 1A for the sake of simplicity, the vehicle 10 is provided with a brake unit that applies a braking force to each of the wheels as is the case with conventional vehicles, and a steering unit for controlling the steering angle of each of the front wheels or the steering angle of each of the front wheels and the right wheels. Further, the vehicle may be a four-wheel-drive vehicle or a front-wheel-drive vehicle.

Figure 1B:
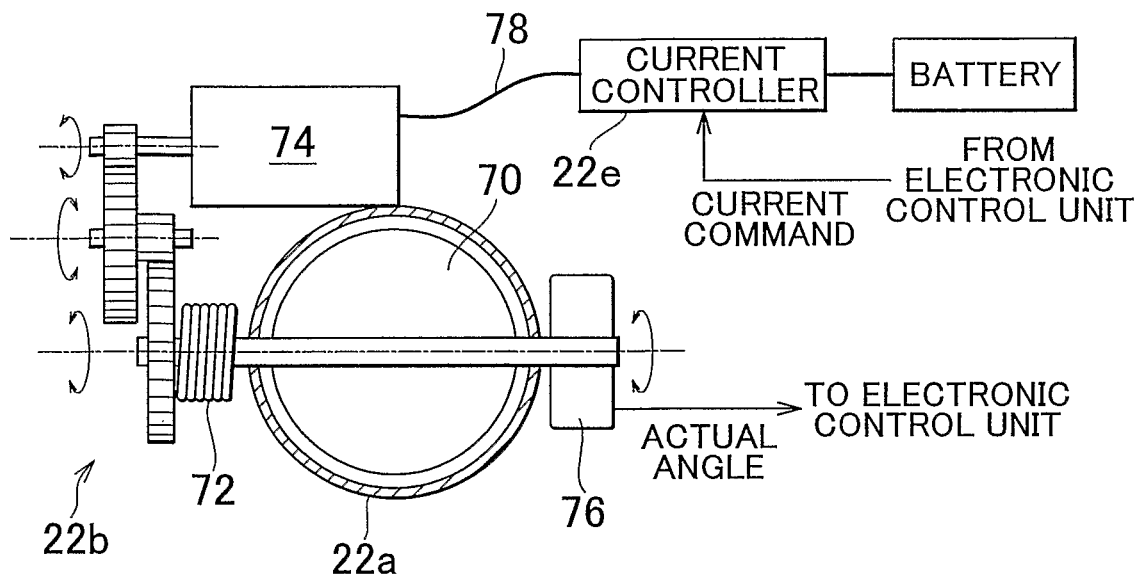
FIGS. 1B and 1C are schematic views of an electronically controlled throttle valve (or a throttle body) employed in an engine of a vehicle of FIG. 1A.
Figure 1C:
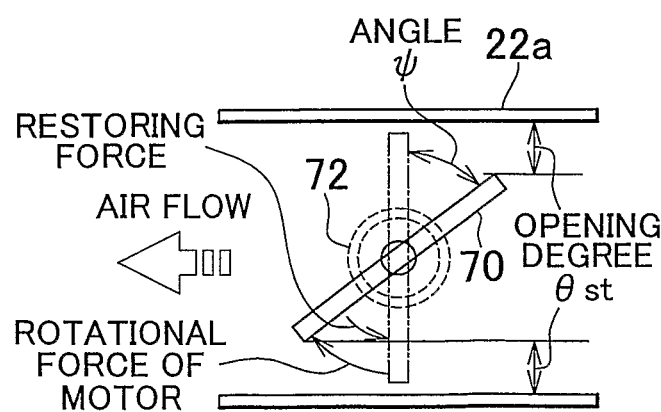

The engine 22 is a gasoline engine of a known design, and an intake pipe 22a is provided with an electronically controlled throttle valve unit 22b of a known type as schematically shown in FIGS. 1B and 1C, with a view to so adjusting an intake air amount as to achieve a requested driving torque that is determined in accordance with a depression amount of an accelerator pedal and later-described control amounts. In the throttle valve unit 22b, as shown in FIGS. 1B and 1C, a valve body 70 is mounted in an intake pipe 22a rotatably around a rotary axis perpendicular to a direction of air flow, and a flow passage area of air in the intake pipe, namely, "a throttle opening degree" is controlled in accordance with an angular position of the valve body 70. The angular position of the valve body 70 or the throttle opening degree is monitored by a throttle position sensor 76 while being controlled by a later-described electronic control unit 50. A throttle motor 74 rotates the valve body 70 against a restoring force of a return spring 72 such that the throttle opening degree coincides with a requested throttle opening degree for achieving a requested value of an intake air amount (i.e., a driving torque), and the angular position of the valve body 70 or the throttle opening degree is thereby adjusted. The throttle motor 74 may be a DC motor or stepping motor that is adopted in a known throttle motor. A current controller 22e controls the current supplied from a battery to the throttle motor 74 via a power conductor 76 on the basis of a current command value given from the electronic control unit 50, and the rotational force of the throttle motor 74 is thereby adjusted. It is known that the current supplied to the motor 74 more drastically increases when the angular position of the valve body is changed than when the angular position is held at a certain position.

Referring again to FIG. 1A, the control of the drive output of the engine 22 is performed by the electronic control unit 50. The electronic control unit 50 may include a drive circuit and a conventionally designed microcomputer having a CPU, a ROM, a RAM, and an input/output port unit that are connected to one another by a bidirectional common bus. A signal indicating each wheel speed Vwi (i=FR, FL, RR, RL), which is transmitted from each wheel speed sensor 30i (i=FR, FL, RR, RL) mounted on a corresponding one of the wheels, a signal indicating an angular position ψ of the throttle valve or a throttle opening degree θst of the throttle valve, which is transmitted from a throttle position sensor 76, and signals indicating a rotational speed ne of the engine, an accelerator pedal depression amount θa, an output rotational speed of a transmission, a shift lever position set by the driver, and the like, which are transmitted from sensors provided at respective portions of the vehicle, are input to the electronic control unit 50. It should be understood that various detection signals for obtaining various parameters necessary for various types of control to be performed in the vehicle according to this embodiment of the invention may be input to the electronic control unit 50 in addition to the aforementioned signals.

Figure 2:
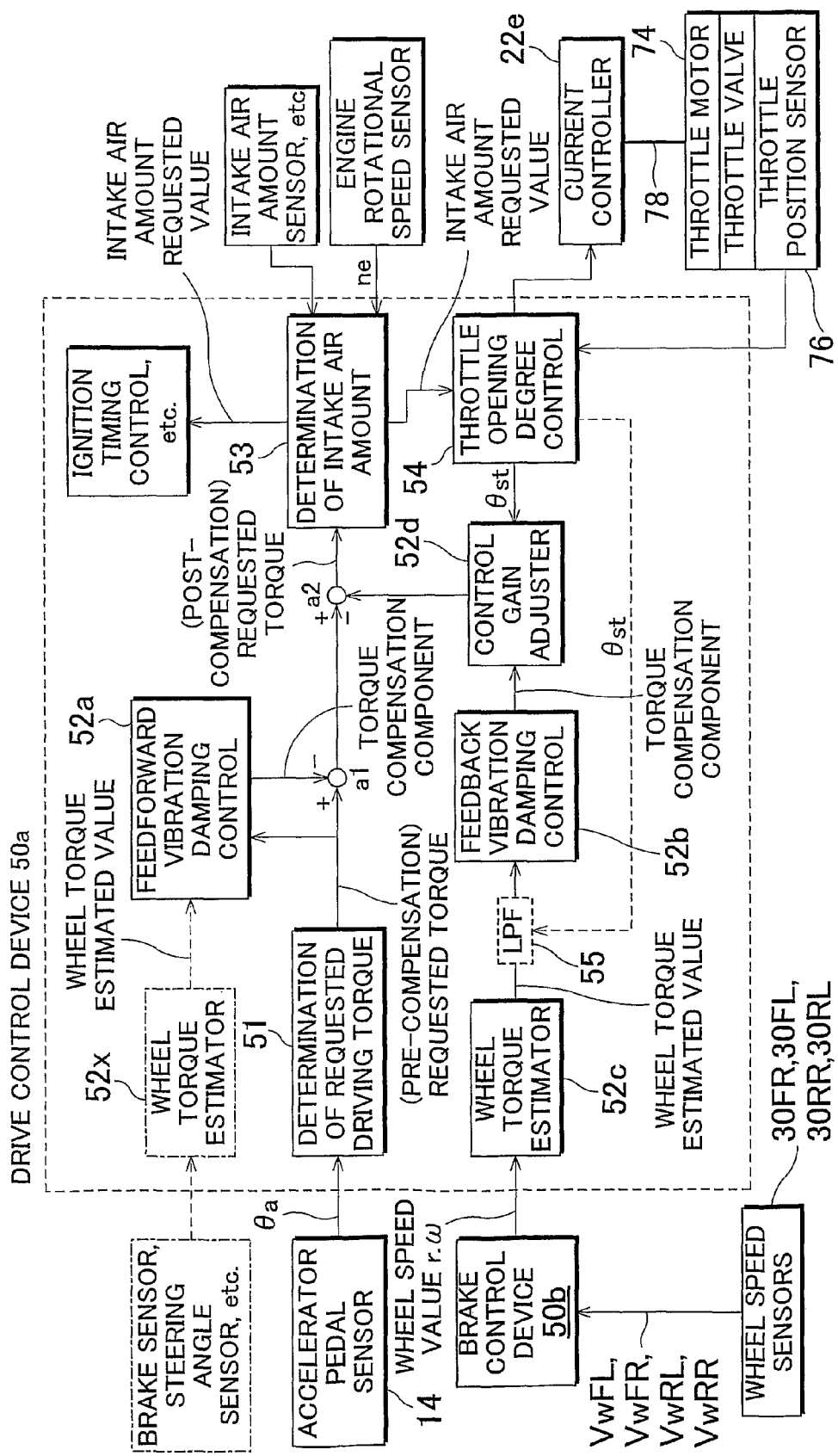
FIG. 2 shows an internal configuration of the electronic control unit shown in FIGS. 1A, 1B, and 1C in the form of a control block diagram. Various parameters other than those shown in FIG. 2, for example, as an engine temperature and the like may be input to an intake air amount determination portion, an ignition timing control portion, and a throttle opening degree control portion. Further, various known control portions (not shown) such as a fuel injection amount control portion and the like may be provided.

The vibration damping control device according to the invention is realized in the aforementioned electronic control unit 50. FIG. 2 shows an internal configuration of this electronic control unit 50 according to the embodiment of the invention in the form of a control block.

Referring to FIG. 2, the electronic control unit 50 may be composed of a drive control device 50a that controls the operation of the engine, a brake control device 50b that controls the operation of the brake unit (not shown), and also various control devices (not shown) installed in an electronic control unit of a known vehicle employing a gasoline engine. It should be understood that the configurations and operations of various control devices such as the drive control device and the like, including the vibration damping control device, are realized through the processing operation of the CPU and the like in the electronic control unit 50 during the driving of the vehicle.

As shown in FIG. 2, a pulse-type electric signal from each of the wheel speed sensors 30FR, 30FL, 30RR, and 30RL on the respective wheels, which is sequentially generated every time a corresponding one of the wheels rotates by a predetermined amount, is input to the brake control device 50b. A rotational speed of each wheel is calculated by measuring a time interval of the arrival of this sequentially input pulse signal. A wheel speed value r·ω is calculated by multiplying this rotational speed of the wheel by a radius of the wheel. The wheel speed value r·ω is then transmitted to the drive control device 50a to perform vibration damping control, which will be described later in detail, and is used in calculating a wheel torque estimated value. Alternatively, the drive control device 50a may calculate the wheel speed from the wheel rotational speed. In this case, the wheel rotational speed is given to the drive control device 50a from the brake control device 50b.

The driving control device 50a includes, as a basic configuration thereof, a requested driving torque determination portion 51 that determines a requested driving torque value of the engine requested by the driver on the basis of an accelerator pedal depression amount θa from the accelerator pedal sensor, a feedforward vibration damping control portion 52a and a feedback vibration damping control portion 52b that calculate requested driving torque compensation components for performing vibration damping control for damping pitch/bounce vibrations of a vehicle body through driving torque control to compensate for (correct) the requested driving torque value, an intake air amount determination portion 53 that determines a requested value of an intake air amount of the engine for achieving the requested driving torque on the basis of the requested driving torque value compensated for by the aforementioned two vibration damping control portions, a throttle opening degree control portion 54 that controls the throttle opening degree on the basis of the requested value of the intake air amount, and various control portions of known types for controlling the ignition timing of fuel and the like.

In this basic configuration, the requested driving torque determination portion 51 may determine the requested driving torque value from the accelerator pedal depression amount θa (and/or a request made through arbitrary automatic running control) according to any known method. As shown in FIG. 2, the feedforward vibration damping control portion 52a receives the (pre-compensation) requested driving torque value determined by the requested driving torque determination portion 51, and calculates a compensation component for reducing or counterbalancing a vibration component in the (pre-compensation) requested driving torque value that can cause pitch/bounce vibrations to the vehicle body according to a mode that will be described later in detail. An adder a1 superposes this compensation component on the (pre-compensation) requested driving torque value. On the other hand, the feedback vibration damping control portion 52b receives an estimated value of a wheel torque actually applied to each of the wheels, which is estimated from the wheel speed r·ω by a wheel torque estimator 52c, and calculates a compensation component for reducing or counterbalancing a vibration component in the wheel torque estimated value that can cause pitch/bounce vibrations to the vehicle body, namely, a disturbance vibration component in the wheel torque, according to a mode that will be described later in detail. An adder a2 superposes this compensation component calculated by the feedback vibration damping control portion on the requested driving torque value. [The feedforward vibration damping control portion may further calculate a compensation component for damping pitch/bounce vibrations resulting from changes in the wheel torque caused to each of the wheels through braking operation or steering operation by the driver. In this case, as indicated by dotted lines in FIG. 2, a wheel torque estimated value estimated on the basis of a brake operation amount or a steering operation amount is input to the feedforward vibration damping control portion, and is processed in the same manner as the requested driving torque value to calculate a compensation component.]

The intake air amount determination portion 53, the throttle opening degree control portion 54, the ignition timing control portion, and the like may perform drive control of a gasoline engine of any known type for achieving a requested driving torque value in a drive output of the gasoline engine. To be specific, the intake air amount determination portion 53 refers to the engine rotational speed ne at that moment, determines a target value of an intake air amount for realizing the requested driving torque in the engine by means of a map determined in advance experimentally or theoretically, then determines a fuel injection amount (not shown) and an ignition timing from a map of the engine rotational speed and the determined target value of the intake air amount, and delivers a control command (not shown) to a corresponding controller. As regards the control of the intake air amount, a requested value of the intake air amount is delivered to the throttle opening degree control portion 54, and a requested value of the throttle opening degree (a requested throttle opening degree) corresponding to the requested value of the intake air amount is determined. The requested throttle opening degree is then compared with an actual value of an opening degree from the throttle position sensor 76 (an actual throttle opening degree). A control command as a command for a current to be supplied to the motor is delivered to the current controller 22e to drive the motor such that the requested throttle opening degree coincides with the actual throttle opening degree. (According to intake air amount control through the adjustment of the throttle opening degree, the drive output (power) of the engine, namely, the output torque of the engine×the rotational speed of the engine is increased/reduced. However, the engine rotational speed is mechanically bound by the vehicle speed, and the vehicle speed is not instantaneously changed. Accordingly, the driving torque of the engine is controlled by setting the throttle opening degree in accordance with the requested value of the intake air amount determined referring to the engine rotational speed.)

In addition to the foregoing basic configuration, in the drive control device mounted with the vibration damping control device according to the embodiment of the invention, a control gain adjuster 52d is provided at an output of the feedback vibration damping control portion 52b as a compensation component adjustment portion for adjusting a control gain for the compensation component of the vibration damping control portion in accordance with an amount of change in the requested throttle opening degree (or the actual throttle opening degree). As described in the section of "SUMMARY OF THE INVENTION", the compensation component for vibration damping control of pitch/bounce vibrations is a vibration component. Accordingly, when the compensation component is superposed on the requested driving torque to compensate for the requested driving torque, the requested driving torque more often vibrates than in the case where vibration damping control is not performed. In order to follow the vibrations of the requested driving torque, the throttle opening degree or the angular position of the throttle valve body may vibrationally change. This vibrational change in the throttle opening degree or the angular position of the throttle valve body leads to an increase in the amount of the current flowing through the throttle motor 74, and the temperatures of the motor and the conductor 78 thereof rise due to Joule heat generated by the current. In this case, the responsiveness of the operation of the throttle valve body by the motor may deteriorate (the follow-up performance of the actual throttle opening degree toward the requested throttle opening degree deteriorates). Then, the effect of vibration damping may not be sufficiently achieved due to, for example, a shift in the phase of driving torque fluctuations through vibration damping control. Further, when the throttle opening degree continues to be adjusted with the responsiveness having thus deteriorated, a further rise in temperature is caused. As a result, a further deterioration in responsiveness may be caused. Thus, in the embodiment of the invention, with a view to suppressing such heat generation in the motor and the conductor 78 thereof, the temperature of the motor or the conductor thereof is estimated on the basis of an amount of change in the throttle opening degree, and a control gain is adjusted to reduce compensation components according to vibration damping control when the temperature is high, as will be described later in detail.

As for the compensation components according to vibration damping control, the compensation component of the feedforward vibration damping control portion aims to reduce or counterbalance that component of the driving torque requested of the engine which causes pitch/bounce vibrations. Therefore, the requested driving torque value compensated for by this compensation component is expected to be smoother and smaller in amplitude than a pre-compensation value thereof. On the other hand, the compensation component of the feedback vibration damping control portion aims to damp pitch/bounce vibrations caused by changes in the wheel torque resulting from disturbances of the wheel torque, namely, external forces acting on the vehicle body or each of the wheels such as the irregularity of a road surface, unbalance of the states of a tire, side wind and the like. Therefore, the requested driving torque value compensated for by this compensation component may be larger in amplitude and include a higher frequency component than a pre-compensation value thereof. That is, a component causing frequent vibrational changes in the throttle opening degree is often the compensation component of the feedback vibration damping control portion. Thus, an adjustor for the control gain for reducing the compensation components according to vibration damping control may be provided only at an output portion of the feedback vibration damping control portion 52b.

Further, instead of or in combination with the aforementioned control gain adjuster 52d, means for performing a low pass filter (LPF) processing for removing or reducing that part of the compensation component which has a frequency higher than a predetermined frequency may be provided on an input side (indicated by dotted lines in FIG. 2) of the feedback vibration damping control portion 52b or an output side (which may be realized in the control gain adjuster 52d) of the feedback vibration damping control portion 52b. As is the case with the adjustment of the control gain, the LPF processing may be performed when the temperature of the motor or the conductor thereof estimated on the basis of the amount of change in the throttle opening degree is high. A frequency for cutting off LPF may be determined experimentally or theoretically.

Operation of Device (i) Pitch/Bounce Vibration Damping Control

In the aforementioned configuration, pitch/bounce vibration damping control may be performed in the following mode by the feedforward vibration damping control portion 52a shown in FIG. 2 and the feedback vibration damping control portion 52b shown in FIG. 2.

(Principle of Vibration Damping Control)

Figure 3A:
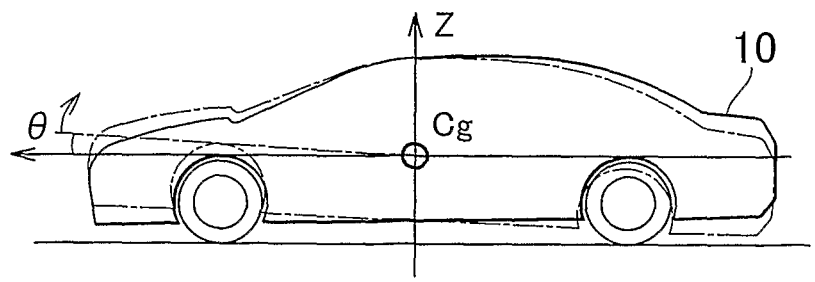
FIG. 3A is a view explaining a state variable of vehicle body vibrations damped during the operation of a vibration damping control portion of a drive control device according to one embodiment of the invention.

In the vehicle, when the drive unit operates on the basis of a drive request made by the driver and the wheel torque fluctuates, bounce vibrations of a center of gravity Cg of the vehicle body in a vertical direction (z direction) and pitch vibrations in a pitch direction (θ direction) around the center of gravity of the vehicle body may occur in the vehicle body 10 exemplified in FIG. 3A. Further, when external forces or torques (disturbances) act on each of the wheels from a road surface during the running of the vehicle, the disturbances are transmitted to the vehicle. In this case as well, vibrations in the bounce direction and the pitch direction may occur to the vehicle body. Thus, in vibration damping control for damping pitch/bounce vibrations as exemplified herein, a kinetic model of pitch/bounce vibrations of the vehicle body is structured. In the model, displacements z and θ of the vehicle body at the time when (a value obtained by converting) a requested driving torque (into a wheel torque) or (an estimated value of) a current wheel torque is input, and change rates thereof dz/dt and dθ/dt, namely, state variables of vehicle body vibrations are calculated, and the driving torque of the drive unit (the engine) is adjusted (the requested driving torque is corrected) such that the state variables obtained from the model converge to 0, namely, that the pitch/bounce vibrations are damped. The amount of adjustment of the driving torque that is calculated when the requested driving torque is input is the compensation component from the feedforward vibration damping control portion, and the amount of adjustment of the driving torque that is calculated when the current wheel torque is input is the compensation component from the feedback vibration damping control portion.

Figure 3B:
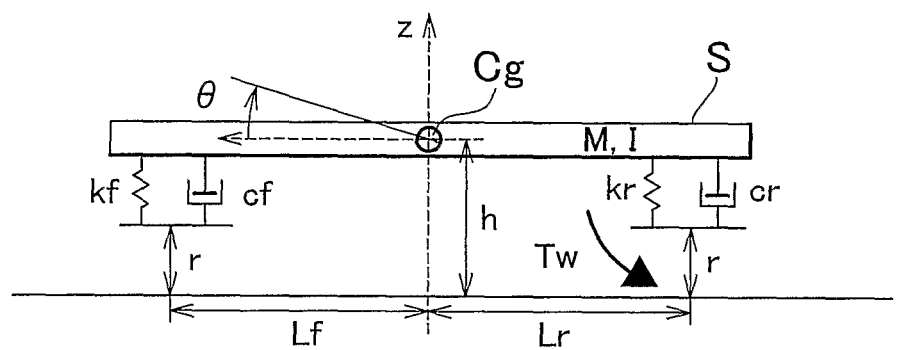
FIG. 3B is a view explaining "a sprung vibration model" as one of mechanical kinetic models of vehicle body vibrations assumed in the vibration damping control portion according to the embodiment of the invention.

Thus, first of all, as a mechanical kinetic model of the vehicle body in the bounce direction and the pitch direction in vibration damping control, the vehicle body is regarded as a rigid body S with a mass M and an inertial moment I, and it is assumed that this rigid body S is supported by a front wheel suspension with a coefficient of elasticity kf and a damping factor cf and a rear wheel suspension with a coefficient of elasticity kr and a damping factor cr (a sprung vibration model of the vehicle body), as exemplified in, for example, FIG. 3B. In this case, an equation of motion of the center of gravity of the vehicle body in the bounce direction and an equation of motion around the center of gravity of the vehicle body in the pitch direction are expressed by Equations 1 shown below.

[Equations 1]

$$Md^2z/dt^2 = -kf(z+Lf\cdot\theta)-cf(dz/dt+Lf\cdot d\theta/dt)-kr(z-Lr\cdot\theta)-cr(dz/dt-Lr\cdot d\theta/dt) \quad (1a)$$

$$Id^2\theta/dt^2 = -Lf\{kf(z+Lf\cdot\theta)-cf(dz/dt+Lf\cdot d\theta/dt)\}+Lr\{kr(z-Lr\cdot\theta)+cr(dz/dt-Lr\cdot d\theta/dt)\}+h/r\cdot T \quad (1b)$$

It should be noted herein that Lf denotes a distance from the center of gravity to a front wheel shaft, that Lr denotes a distance from the center of gravity to a rear wheel shaft, that r denotes a radius of the wheels, and that h denotes a height of the center of gravity from the road surface. In the equation (1a), the first term and the second term are components of a force from the front wheel shaft, and the third term and the fourth term are components of a force from the rear wheel shaft. In the equation (1b), the first term is a moment component of the force from the front wheel shaft, and the second term is a moment component of the force from the rear wheel shaft. The third term in the equation (1b) is a moment component of a force that acts around the center of gravity of the vehicle body by a wheel torque T applied to each of the driving wheels.

The aforementioned equations (1a) and (1b) can be rewritten into the form of a state equation (of a linear system) as expressed by an equation (2a) shown below, on the assumption that the displacements z and θ of the vehicle body and the change rates thereof dz/dt and dθ/dt constitute a state variable vector X(t).

$$dX(t)/dt = A \cdot X(t) + B \cdot u(t) \tag{2a}$$

It should be noted herein that X(t), A, and B are expressed as follows.

$$X(t) = \begin{pmatrix} z \\ dz/dt \\ \theta \\ d\theta/dt \end{pmatrix}, \quad [\text{Equation 2}]$$

$$A = \begin{pmatrix} 0 & 1 & 0 & 0 \\ a1 & a2 & a3 & a4 \\ 0 & 0 & 0 & 1 \\ b1 & b2 & b3 & b4 \end{pmatrix}, B = \begin{pmatrix} 0 \\ 0 \\ 0 \\ p1 \end{pmatrix}$$

Respective elements a1 to a4 and b1 to b4 of a matrix A are given by collecting up the coefficients of z, θ, dz/dt, and dθ/dt in the equations (1a) and (1b) respectively. That is, a1=−(kf+kr)/M, a2=−(cf+cr)/M, a3=−(kf·Lf−kr·Lr)/M, a4=−(cf·Lf−cr·Lr)/M, b1=−(Lf·kf−Lr·kr)/I, b2=−(Lf·cf−Lr·cr)/I, b3=−(Lf²·kf+Lr²·kr)/I, and b4=−(Lf²·cf+Lr²·cr)/I. Further, u(t) is expressed as u(t)=T, and is an input of a system expressed by the state equation (2a). Therefore, according to the equation (1b), an element p1 of a matrix B is expressed as p1=h/(I·r).

Given that u(t)=−K·X(t) . . . (2b) in the state equation (2a), the state equation (2a) turns into dX(t)/dt=(A−BK)·X(t) . . . (2c). Accordingly, a torque value u(t) for damping pitch/bounce vibrations is determined if a gain K for converging X(t), namely, the magnitudes of the displacements in the bounce direction and the pitch direction and the change ratios thereof over time to 0 is determined when the differential equation (2c) of the state variable vector X(t) is solved with an initial value X₀(t) of X(t) set as X₀(t)=(0, 0, 0, 0) (on the assumption that no vibrations are caused before the inputting of torque). A value obtained by converting this torque value u(t) into the unit of the engine driving torque constitutes a compensation component according to vibration damping control.

The gain K can be determined using a so-called optimal regulator theory. According to this theory, it is known that, when the value of an evaluation function in the quadratic form, that is, J=½·∫(X$^T$QX+u$^T$Ru)dt . . . (3a) (the range of integration is 0 to ∞) is minimized, X(t) stably converges in the state equation (2a) and a matrix K that minimizes the evaluation function J is given by an equation: K=R$^{-1}$·B$^T$·P. It should be noted herein that P is a solution of a Riccati equation: −dP/dt=A$^T$P+PA+Q−PBR$^{-1}$B$^T$P. The Riccati equation can be solved according to any method known in the field of a linear system. The gain K is thereby determined.

Q and R in the aforementioned evaluation function J and the Riccati equation are an arbitrarily set semi-positive definite symmetric matrix and an arbitrarily set positive definite symmetric matrix respectively. These matrices are weighting matrices of the evaluation function J that are determined by a designer of the system. For example, in the case of the kinetic model in question, Q and R are set as follows.

$$Q = \begin{pmatrix} 1 & 0 & 0 & 0 \\ 0 & 10^3 & 0 & 0 \\ 0 & 0 & 1 & 0 \\ 0 & 0 & 0 & 10^2 \end{pmatrix}, R = (1) \quad [\text{Equation 3}]$$

In the equation (3), when the norms (magnitudes) of specific ones of state vector components, for example, dz/dt and dθ/dt are set larger than the norms of other components, for example, z and θ respectively, the components whose norms are set larger are more stably converged. Further, when the values of the components of Q are increased, the value of the state vector swiftly converges to a stable value attaching importance to a transient characteristic. When the value of R is increased, the amount of energy consumption is reduced.

Figure 3C:
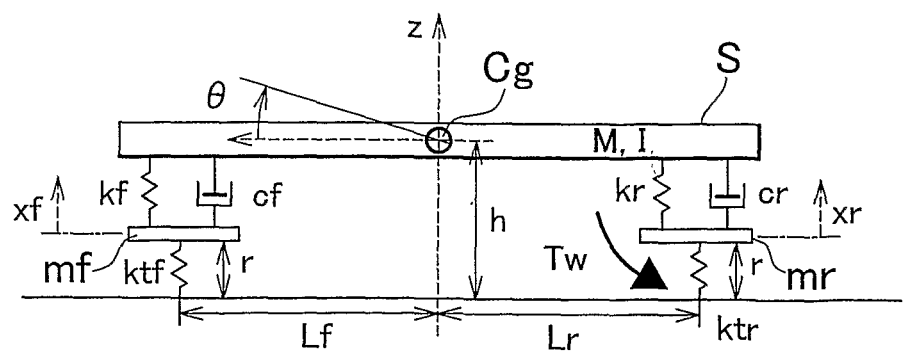
FIG. 3C is a view explaining a sprung/unsprung vibration model.

For example, as shown in FIG. 3C, a model taking spring elasticity of the tires of the front wheels and the tires of the rear wheels into account (a sprung/unsprung vibration model of the vehicle body) may be adopted in addition to the configuration of FIG. 3B, as a mechanical kinetic model of the vehicle body in the bounce direction and the pitch direction. Given that the tires of the front wheels and the tires of the rear wheels have a coefficient of elasticity ktf and a coefficient of elasticity ktr respectively, an equation of motion of the center of gravity of the vehicle body in the bounce direction and an equation of motion of the center of gravity of the vehicle body in the pitch direction are expressed by equations 4 shown below, as is understood from FIG. 3C.

[Equations 4]

$$Md^2z/dt^2 = -kf(z+Lf\cdot\theta-xf)-cf(dz/dt+Lf\cdot d\theta/dt-dxf/dt)-kr(z-Lr\cdot\theta-xr)-cr(dz/dt-Lr\cdot d\theta/dt-dxr/dt) \tag{4a}$$

$$Id^2\theta/dt^2 = -Lf\{kf(z+Lf\cdot\theta-xf)-cf(dz/dt+Lf\cdot d\theta/dt-dxf/dt)\}+Lr\{kr(z-Lr\cdot\theta-xr)+cr(dz/dt-Lr\cdot d\theta/dt-dxr/dt)\}+h/r\cdot T \tag{4b}$$

$$mfd^2xf/dt^2 = kf(z+Lf\cdot\theta-xf)+cf(dz/dt+Lf\cdot d\theta/dt-dxf/dt)+ktf\cdot xf \tag{4c}$$

$$mrd^2xr/dt^2 = kr(z-Lr\cdot\theta-xr)+cr(dz/dt-Lr\cdot d\theta/dt-dxr/dt)+kt\cdot xr \tag{4d}$$

It should be noted herein that xf denotes an unsprung displacement amount of each of the front wheels, that xr denotes an unsprung displacement amount of each of the rear wheels, that mf denotes an unsprung mass of each of the front wheels, and that mr denotes an unsprung mass of each of the rear wheels. The equations (4a) and (4b) constitute a state equation as expressed by the equation (2a) as in the case of FIG. 3B, with z, θ, xf, xr, and time differential values thereof serving as a state variable vector (it should be noted, however, that the matrix A is composed of 8 lines and 8 columns and that the matrix B is composed of 8 lines and 1 column). The gain matrix K for converging the magnitude of the state variable vector to 0 can be determined according to the optimal regulator theory.

(Configuration of Vibration Damping Control Portion)

The control configurations of the feedforward vibration damping control portion 52a and the feedback vibration damping control portion 52b, each of which calculates a compensation component U for the aforementioned pitch/bounce vibration damping control, are shown in FIGS. 4A and 4B respectively. First of all, referring to FIG. 4A, in the feedforward vibration damping control portion 52a of FIG. 2, a requested driving torque value from the requested driving torque determination portion 51 is converted into a wheel torque Two and then input to the kinetic model (a wheel torque estimated value corresponding to a brake operation amount or a steering operation amount may also be input thereto). In the kinetic model, the state variable vector X(t) is calculated by solving the differential equation (2a) using the torque input value Two. Then, the value u(t), which is obtained by multiplying the state variable vector X(t) by the gain K so determined as to converge the state variable vector X(t) to 0 or the minimum value as described above, is calculated. The value u(t) is converted into the compensation component U(t) in the unit of the driving torque of the engine and transmitted to the adder a1. Then, in the adder a1, the compensation component U(t) is subtracted from the requested driving torque value. As is also understood from the equations (1a) and (1b), the pitch/bounce vibration system of the vehicle body is a resonance system. The value of the state variable vector for an arbitrary input is substantially constituted only by frequency components in a band having a certain spectrum characteristic substantially around a natural frequency (about 1 to 5 Hz) of the system. Thus, that component of the requested driving torque which corresponds to the natural frequency, namely, that component of the requested driving torque which causes pitch/bounce vibrations in the vehicle body is reduced or removed by adopting a configuration in which U(t) is subtracted from the requested driving torque. As a result, pitch/bounce vibrations in the vehicle body are damped.

The configuration of the feedback vibration damping control portion 52b shown in FIG. 4B is identical to that of the feedforward vibration damping control portion except in that (the estimated value of) a wheel torque Tw actually applied to each of the wheels is input. However, when being input, the wheel torque Tw may be multiplied by a feedback control gain FB (a gain for adjusting the balance between the contribution of a driver requested wheel torque Tw0 to the kinetic model and the contribution of the wheel torque estimated value Tw to the kinetic model). Further, as shown in FIG. 2, the compensation component as the output of the feedback vibration damping control portion is superposed on the requested driving torque by the adder a2 via the control gain adjuster 52d. The drive output of the engine is so adjusted as to damp pitch/bounce vibrations resulting from wheel torque disturbances. Furthermore, in the case where the LPF processing is performed at the input of the feedback vibration damping control portion, the wheel torque estimated value having a frequency limited to a value equal to or lower than a cutoff frequency through the LPF processing is input to the kinetic model.

It is ideal to provide each of the wheels with a torque sensor and actually detect the value of the wheel torque actually applied to each of the wheels, which is input in FIG. 4B. However, it is difficult to provide each of the wheels of a conventional vehicle with a torque sensor. Thus, in the example shown in FIG. 4B, the wheel torque estimated value estimated from other detectable values in the running vehicle using the wheel torque estimator 52c (FIG. 2) is used as a disturbance input of the wheel torque. The wheel torque estimated value Tw can be typically estimated as $Tw=M \cdot r^2 \cdot d\omega/dt \ldots$ (5), using the time differential of the wheel rotational speed $\omega$ or the wheel speed value $r \cdot \omega$, which is obtained from each of the wheel speed sensors for the driving wheels. It should be noted herein that M denotes a mass of the vehicle, and that r denotes a radius of the wheels. [Given that the sum of driving forces generated by the driving wheels at locations of a road surface where the driving wheels are grounded is equal to a driving force $M \cdot G$ (G denotes an acceleration) of the entire vehicle, the wheel torque Tw is given by an equation: $Tw=M \cdot G \cdot r \ldots$ (5a). The acceleration G of the vehicle is given by an equation: $G=r \cdot d\omega/dt \ldots$ (5b), using a differential value of the wheel speed $r \cdot \omega$. Therefore, the wheel torque is estimated as expressed by the equation (5).] The wheel torque estimated value may be estimated from a rotational speed of the engine or a rotational speed of the transmission instead of being estimated from the wheel speed. This case also belongs to the scope of the invention.

(ii) Configuration for Suppressing Heat Generation of Throttle Motor and Conductor Thereof In the control device according to the embodiment of the invention, as described already, the control gain adjuster 52d for adjusting the control gain for the compensation component as the output of the feedback vibration damping control portion to suppress heat generation of the throttle motor and the conductor thereof is provided. The control gain adjuster 52d estimates the temperature of the motor or the conductor thereof on the basis of the amount of change in the throttle opening degree, and reduces the control gain for the compensation component according to vibration damping control when the estimated temperature is high. In this respect, it has been found out in the course of studies/development by the inventor of the invention and the like that the temperature of the motor conductor can be estimated as a function of the frequency and amplitude of the throttle opening degree (according to this knowledge, the temperature of the motor conductor increases as each of the frequency and amplitude of the throttle opening degree increases). Thus, in this embodiment of the invention, the map giving the estimated value of the temperature of the motor conductor using the frequency and amplitude of the amount of change in the throttle opening degree as variables is prepared. The temperature of the motor conductor is then estimated, using the map, from the instantly detected values of the frequency and amplitude of the amount of change in the throttle opening degree. When the estimated temperature is higher than a predetermined value, the control gain for the compensation component is reduced to avoid a further rise in the temperature.

Figure 5A:
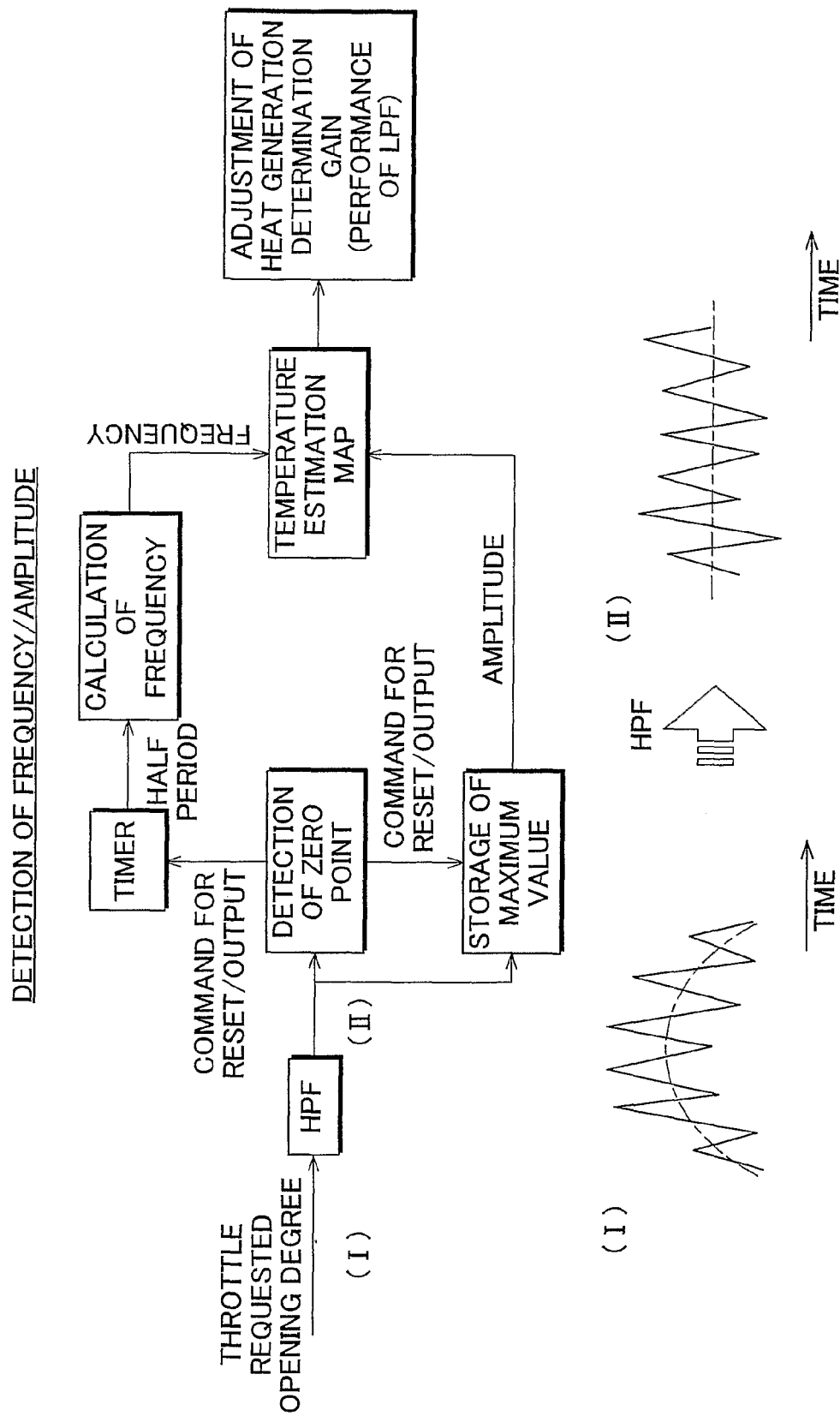
FIG. 5A shows the configuration of the interior of a control gain adjustment portion of FIG. 2 in the form of a control block diagram.

FIG. 5A shows the configuration of this adjustor in the form of a control block diagram. Referring to FIG. 5A, as exemplified in FIG. 2 as well, the requested throttle opening degree (which may be the actual throttle opening degree or the target value or actual value of the angular position of the valve body) is input to the control gain adjuster 52d from the throttle opening degree control portion 54. Then, the vibration component resulting from the compensation component obtained by the vibration damping control portion is first extracted from this requested throttle opening degree (the throttle opening degree includes a component equivalent to a change in the requested driving torque, which corresponds to the request for acceleration/deceleration of the vehicle made by the driver, an automatic running control device, or the like). The processing of extraction may be performed by, for example, passing the requested throttle opening degree through a high pass filter (HPF) (HPF may be carried out according to any known type of analog or digital filter processing method). By being subjected to the HPF processing, the value of the requested throttle opening degree shifts from a state in which a high frequency component and a low frequency component are superposed on each other as indicated by (I) in FIG. 5A to a state of only a high frequency component indicated by (II) in FIG. 5A, namely, a vibration component corresponding to frequent changes that cause an increase in the current supplied to the throttle motor.

Figure 5B:
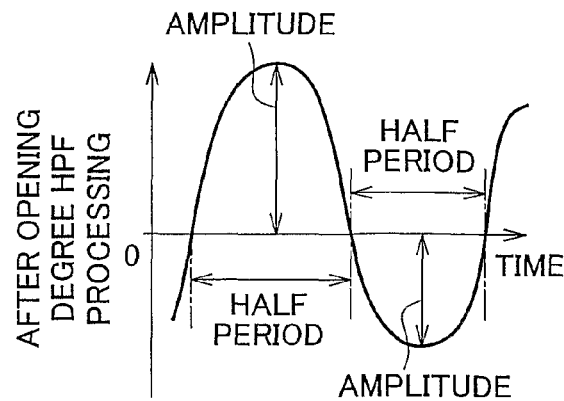
FIG. 5B is a view explaining a method of calculating a change in the throttle opening degree over time, a frequency of the throttle opening degree, and an amplitude of the throttle opening degree after an HPF processing.

After the HPF processing of the requested throttle opening degree value, the frequency and amplitude of the extracted vibration component are then detected (by a frequency/amplitude detection portion). The frequency and the amplitude may be detected in any known form. As an example, the frequency and amplitude of the amount of change in the requested throttle opening degree value may be detected by measuring a time from a time point when the (post-HPF processing) requested throttle opening degree value, which changes over time as shown in FIG. 5B, passes a certain zero point to a time point when the requested throttle opening degree value passes a subsequent zero point and a maximum value (an absolute value) during that time. (To be more strict, the frequency and amplitude in a time from a time point when the requested throttle opening degree value passes a certain zero point to a time point when the requested throttle opening degree value passes a subsequent zero point are detected.) More specifically, the (post-HPF processing) requested throttle opening degree value is sequentially input to each of a maximum value storage portion and a zero point detection portion as shown in FIG. 5A. The zero point detection portion delivers a reset/output command signal to a timer and the maximum value storage portion every time the post-HPF processing requested throttle opening degree value passes a zero point. Upon receiving the reset/output command signal from the zero point detection portion, the timer starts the measurement of time. Upon receiving a reset/output command signal subsequently, the timer outputs the time measured so far (which is equivalent to a half period of the requested throttle opening degree value in FIG. 5B), resets the time measured so far, and restarts the measurement of time from 0. A frequency calculation portion then calculates the frequency of the requested throttle opening degree value from the output value of the measured time. On the other hand, the maximum value storage portion always stores the maximum value of the absolute value of the requested throttle opening degree value that arrives sequentially. However, upon receiving a reset/output command signal from the zero point detection portion, the maximum value storage portion outputs the maximum value stored so far, and resets the stored value of the maximum value stored so far to 0. It should be noted herein that the value output from the maximum value storage portion is equivalent to the amplitude from a time point when the requested throttle opening degree value passes a certain zero point to a time point when the requested throttle opening degree value passes a subsequent zero point as shown in FIG. 5B.

Figure 5C:
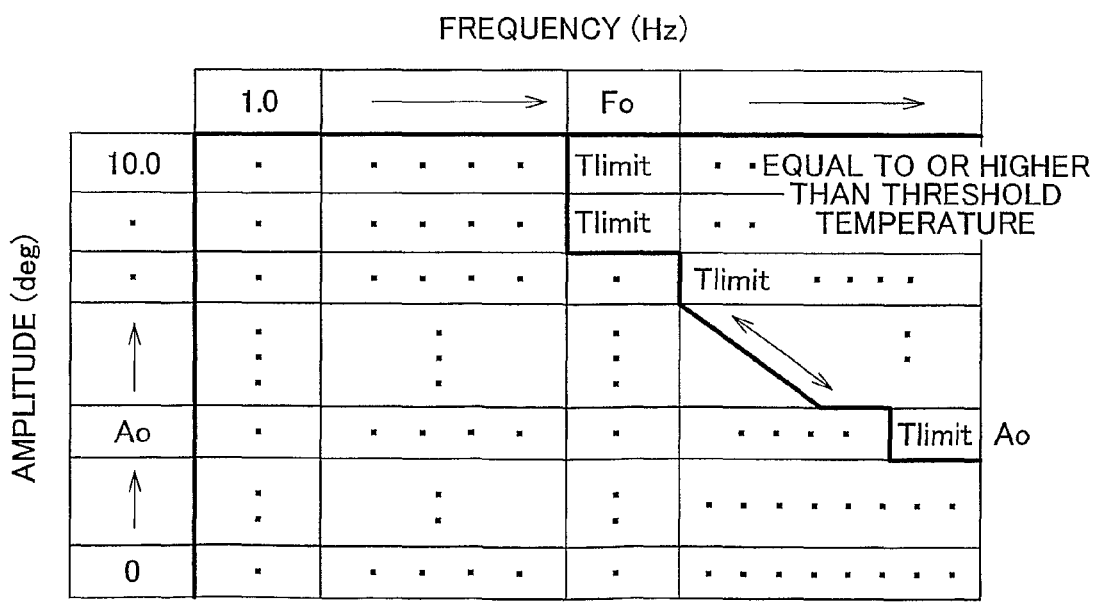
FIG. 5C schematically shows a map of an estimated temperature of a motor conductor in which the frequency and amplitude of the throttle opening degree are used as variables. Each point within a frame of FIG. 5C indicates that an estimated temperature is given. Further, a thick solid line drawn between a frequency Fo and an amplitude Ao within the frame of FIG. 5C represents a border of a threshold Tlimit of the estimated temperature. Each arrow in an upper blank shows a direction in which the frequency increases, and each arrow in a left blank shows a direction in which the amplitude increases.

When the frequency and amplitude of the requested throttle opening degree are thus determined, a temperature of the motor conductor is estimated using a map as exemplified in FIG. 5C. As mentioned already, the temperature of the motor conductor can be determined using the frequency and amplitude of the requested throttle opening degree as parameters. Therefore, the map may be dawn up in advance by, for example, measuring the temperature of the motor conductor by means of a temperature gauge such as a thermocouple or the like while changing the frequency and amplitude of the requested throttle opening degree in various manners within an assumed range in manufacturing/assembling the vehicle. As mentioned already, the temperature of the motor conductor rises as the frequency of the requested throttle opening degree increases or as the amplitude of the requested throttle opening degree increases. In the map of FIG. 5C, the value of the temperature increases toward an upper right region. Further, the map of FIG. 5C can be said to be a data base for determining the amount of adjustment of torque compensation control in accordance with the frequency and the amplitude. The control of reducing the amount of adjustment of the throttle opening degree as each of the frequency and the amplitude increases is performed on the basis of this map.

That is, as shown in this map of FIG. 5C, whether or not a threshold temperature Tlimit is exceeded depends on both conditions, namely, the frequency and the amplitude. For example, referring herein to a case where the amplitude is "A0", the threshold temperature Tlimit is exceeded only in a highest frequency band (a column on the left side of FIG. 5C). On the other hand, referring to a case where the frequency is "F0", the threshold temperature Tlimit is exceeded only in a highest amplitude band (a line on the upper side of FIG. 5C). Thus, one of the condition of the frequency and the condition of the amplitude is changed on the basis of the other. More specifically, the control may be performed such that the condition regarding the frequency is tightened—the frequency at which the adjustment of the throttle opening degree is limited decreases—as the amplitude increases, and the control may be performed such that the condition regarding the amplitude is tightened—the amplitude at which the adjustment of the throttle opening degree is limited decreases—as the frequency increases. In other words, the temperature of the motor conductor is estimated to rise as the frequency of the throttle opening degree increases and as the amplitude of the throttle opening degree increases. Therefore, as shown in FIG. 5C, the predetermined value of the frequency giving the threshold temperature Tlimit decreases as the amplitude increases, and the predetermined value of the amplitude giving the threshold temperature Tlimit decreases as the frequency increases.

When the temperature of the motor conductor is estimated using the frequency and amplitude of the requested throttle opening degree as described above, a heat generation determination portion determines whether or not the estimated temperature is higher than a predetermined threshold temperature $T_{limit}$. When an estimated temperature $T_{est}$ is higher than the threshold temperature $T_{limit}$, namely, when there is established a relationship: $T_{est} \geq T_{limit}$ . . . (A), the control gain is reduced. In principle, the control gain should always be reduced during a period in which the estimated temperature is higher than the threshold temperature $T_{limit}$, namely, during a period in which the condition (A) is fulfilled. However, as described above, in the case where the frequency and the amplitude, which are determined at intervals of a half period of vibrations of the requested throttle opening degree, are used as parameters for estimating the temperature, the determination on the condition (A) disperses greatly. Accordingly, while the determination on the condition (A) is made at intervals of the half period of vibrations of the requested throttle opening degree, which is sequentially input, the reduction of the control gain may be started when the estimated temperature becomes higher than the threshold temperature $T_{limit}$ even once. However, the reduction of the control gain may be started only when the condition (A) is fulfilled a predetermined number (the number of predetermined half periods) of times within a predetermined period or more often or when the condition (A) is consecutively fulfilled a predetermined number of times or more (for this purpose, a counter for counting the number of times of fulfillment of the condition (A) may be prepared at the heat generation determination portion). Further, the processing of reducing the control gain may be canceled after the lapse of a predetermined time from the start thereof.

A concrete processing of reducing the control gain may be performed according to any method as long as the magnitude of the compensation component is reduced. For example, in the case where the control gain adjuster 52*d* is configured to give to the adder a2 a value obtained by multiplying the compensation component U of vibration damping control by a control gain λ, namely, λ·U . . . (6), the control gain λ is usually set as λ=1 ... (7). However, in the case where the control gain is reduced on the basis of fulfillment of the aforementioned condition (A), the control gain λ may be set as λ=λo (<1) (7a). Further, as another mode, the value of the control gain λ may also be set as a function of the estimated temperature.

Also, in the case where the LPF processing is performed for the input of feedback vibration damping control as described above instead of reducing the control gain, as well as the case where the control gain is reduced, the LPF processing may be performed when the estimated temperature of the conductor, which is estimated on the basis of the frequency and amplitude of the throttle opening degree, becomes higher than the threshold temperature. Further, as in the foregoing case, the temperature of the body of the throttle motor may be estimated on the basis of the frequency and amplitude of the throttle opening degree, and the control gain may be reduced or the LPF processing may be performed on the basis of the estimated temperature.

Thus, according to the foregoing configuration, when there arises a situation where a large current (i.e., with a large amplitude) is supplied to the motor more often than usual (i.e., with a high frequency) in accordance with the state of vibrational changes in the throttle opening degree in performing vibration damping control through drive output control, part of the compensation component of vibration damping control is temporarily reduced, and the motor or the conductor thereof can be protected against a rise in temperature. Accordingly, a deterioration in the effect of vibration damping resulting from a decrease in the responsiveness of the throttle can be avoided. In this respect, the compensation component of vibration damping control is partially or temporarily reduced as described above. It should therefore be understood that the control operation of vibration damping control does not need to be weakened substantially.

The foregoing description has been given as to the embodiment of the invention, but this embodiment of the invention can be easily subjected to many corrections and many modifications by those skilled in the art. It is obvious that the invention is not exclusively limited to the embodiment exemplified above but is applicable to various devices without departing from the concept of the invention.

For example, the wheel torque estimated value in the foregoing embodiment of the invention is estimated from the wheel speed. However, the wheel torque estimated value may be estimated from a parameter other than the wheel speed. Further, vibration damping control in the foregoing embodiment of the invention utilizes the optimal regulator theory assuming the sprung kinetic model or the sprung/unsprung kinetic model as the kinetic model. However, the concept of the invention is also applied to a control device adopting a kinetic model other than those introduced herein or a control device that damps vibrations according to a control method other than the optimal regulator as long as the wheel torque is utilized. In this case as well, the control device belongs to the scope of the invention. For example, it is also appropriate to detect pitch/bounce vibrations of the vehicle body from an output value of an on-vehicle G sensor or any other sensor capable of detecting pitch/bounce vibrations of the vehicle body, and adjust the driving torque or throttle opening degree to restrain this pitch/bounce vibration component of the vehicle body. Further, the resonance frequency band of vehicle body vibrations is known to a certain extent. Thus, it is also appropriate to extract a fluctuation component of the wheel torque in that band, and perform driving torque control or throttle opening degree control to reduce or counterbalance the fluctuation component.

Further, in the aforementioned example, the temperature of the motor conductor is estimated by detecting the frequency and amplitude of the throttle opening degree. In first place, however, the vibrations of the throttle opening degree result from the vibrations of the compensation component. Therefore, it is also appropriate to prepare a map of the estimated temperature of the motor conductor using the frequency and amplitude of the compensation component of vibration damping control as parameters, and determine, with reference to the map, the necessity to perform the processing of reducing the control gain. Furthermore, in the foregoing embodiment of the invention, the control gain is reduced or the LPF processing is performed as to the compensation component of the feedback vibration damping control portion. However, a similar processing may also be performed for the compensation component according to the feedforward vibration damping control portion.

Furthermore, the temperature of the aforementioned motor or the conductor thereof may be directly detected by a temperature sensor such as a thermocouple or the like. The processing of reducing the control gain or the LPF processing as described above may be performed when the temperature reaches the threshold. Further, in this case, when the temperature does not fall or further rises to reach a second threshold higher than the aforementioned threshold despite the performance of the processing of reducing the control gain or the LPF processing, the operation of the throttle motor may be (temporarily) stopped to lower the temperature of the motor or the conductor thereof. (The valve body is returned to a neutral position by a spring. In this process, the intake air amount becomes equal to an amount allowable in the case where the valve body is at the neutral position, and torque control is performed through the adjustment of the ignition timing, the fuel injection amount, or the like.) According to this configuration, a recovery of the responsiveness of the valve body by the throttle motor is expected.

Furthermore, the temperature of the aforementioned motor or the conductor thereof may be estimated on the basis of the frequency and/or amplitude of the output value of the on-vehicle G sensor or any other sensor capable of detecting pitch/bounce vibrations of the vehicle body. In this case, with increases in the frequency and/or amplitude of the output value of the sensor, the amount of change in the throttle opening degree or the frequency of change in the throttle opening degree increases, and the temperature of the motor or the conductor thereof is estimated to rise.

In the foregoing embodiment of the invention, the operation mechanism for the throttle valve body is designed such that the valve body is rotated by the throttle motor. However, the operation mechanism may also be designed such that the valve body is driven by any other actuator, for example, an electromagnetic solenoid or the like. It should be understood that this case also belongs to the scope of the invention.

The invention claimed is:

1. A vehicular vibration damping control device that performs vibration damping control of damping pitch vibrations or bounce vibrations of a vehicle through control of a drive output of the vehicle, comprising:
   a vibration damping control portion that controls a driving torque of an engine in such a manner as to restrain an amplitude of the pitch vibrations or the bounce vibrations on a basis of a wheel torque acting on each wheel of the vehicle, which is generated at a location of a road surface where the wheel is grounded; and
   a compensation component adjustment portion that alters a magnitude of at least part of a compensation component for compensating for the wheel torque for the vibration damping control, which is calculated by the vibration damping control portion, on a basis of a temperature of a throttle motor for adjusting a throttle opening degree of the engine, wherein the compensation component adjustment portion which compensates the wheel torque for the vibration damping control estimates a temperature of a conductor for supplying a current to the throttle motor for adjusting the throttle opening degree on a basis of an amount of change in the throttle opening degree, wherein the compensation component adjustment portion which compensates the wheel torque for the vibration damping control reduces the magnitude of at least part of the compensation component when the temperature of the conductor becomes higher than a predetermined value, and wherein the compensation component adjustment portion reduces the magnitude of at least part of the compensation component for compensating for the wheel torque when a frequency or amplitude of the amount of change in the throttle opening degree becomes equal to or larger than a predetermined value.

2. The vibration damping control device according to claim 1, wherein the compensation component adjustment portion reduces the magnitude of at least part of the compensation component for compensating for the wheel torque when a phenomenon of the frequency or amplitude of the amount of change in the throttle opening degree becoming equal to or larger than the predetermined value is observed even once.

3. The vibration damping control device according to claim 1, wherein the compensation component adjustment portion reduces the magnitude of at least part of the compensation component for compensating for the wheel torque when a phenomenon of the frequency or amplitude of the amount of change in the throttle opening degree becoming equal to or larger than the predetermined value is observed more than a predetermined number of times consecutively or within a predetermined period.

4. The vibration damping control device according to claim 1, wherein the compensation component adjustment portion reduces the magnitude of at least part of the compensation component by reducing a control gain for the compensation component.

5. The vibration damping control device according to claim 1, wherein the compensation component adjustment portion reduces the magnitude of at least part of the compensation component by removing that part of a wheel torque value input to the vibration damping control portion or the compensation component which has a frequency higher than a predetermined frequency.

6. The vibration damping control device according to claim 1, wherein the vibration damping control portion includes a feedforward vibration damping control portion that calculates a compensation component for controlling a driving torque of the engine in such a manner as to restrain an amplitude of pitch vibrations or bounce vibrations caused by a wheel torque generated through a request for acceleration/deceleration of the vehicle or a request for a turn of the vehicle, and a feedback vibration damping control portion that calculates a compensation component for controlling a driving torque of the engine in such a manner as to restrain an amplitude of pitch vibrations or bounce vibrations caused by a wheel torque actually applied to each wheel, and wherein the compensation component adjustment portion alters the magnitude of at least part of the compensation component which is calculated by the feedback vibration damping control portion.

7. The vibration damping control device according to claim 1, wherein the temperature of an actuator of the throttle valve is calculated based on a requested throttle opening degree or calculated based on an actual throttle opening degree.

8. The vibration damping control device according to claim 1, wherein the predetermined value of the frequency decreases as the amplitude increases, and the predetermined value of the amplitude decreases as the frequency increases.

9. The vibration damping control device according to claim 1, wherein the amount of change in the throttle opening degree is non-zero.

10. The vibration damping control device according to claim 1, wherein the predetermined value for the temperature of the conductor is larger than zero.

11. A vehicle comprising a vibration damping control device according to claim 1.

12. The vehicle according to claim 11, wherein the vibration damping control device reduces the amount of change in the throttle opening degree when the temperature of an actuator of the throttle valve rises.

13. The vehicle according to claim 11, further comprising a temperature sensor provided on an actuator of the throttle valve or a conductor thereof, and detecting a temperature of the actuator of the throttle valve or the conductor thereof by means of the temperature sensor.

14. The vehicle according to claim 11, wherein the vibration damping control device reduces the amount of change in the throttle opening degree when the temperature of the actuator of the throttle valve becomes equal to a first temperature, and stops the throttle valve from operating when the temperature of an actuator of the throttle valve becomes equal to a second temperature higher than the first temperature.

15. A vehicular vibration damping control device that performs vibration damping control of damping pitch vibrations or bounce vibrations of a vehicle through control of a drive output of the vehicle, comprising:

circuitry configured to control a driving torque of an engine in such a manner as to restrain an amplitude of the pitch vibrations or the bounce vibrations on a basis of a wheel torque acting on each wheel of the vehicle, which is generated at a location of a road surface where the wheel is grounded, alter a magnitude of at least part of a compensation component for compensating for the wheel torque for the vibration damping control, which is calculated by a vibration damping control portion, on a basis of a temperature of a throttle motor for adjusting a throttle opening degree of the engine, estimate a temperature of a conductor for supplying a current to the throttle motor for adjusting the throttle opening degree on a basis of an amount of change in the throttle opening degree, reduce the magnitude of at least part of the compensation component when the temperature of the conductor becomes higher than a predetermined value, and reduce the magnitude of at least part of the compensation component for compensating for the wheel torque when a frequency or amplitude of the amount of change in the throttle opening degree becomes equal to or larger than a predetermined value.

* * * * *